(12) United States Patent
Matthews

(10) Patent No.: US 11,705,251 B2
(45) Date of Patent: Jul. 18, 2023

(54) FUEL DESIGN AND SHIELDING DESIGN FOR RADIOISOTOPE THERMOELECTRIC GENERATORS

(71) Applicant: Zeno Power Systems, Inc., Alexandria, VA (US)

(72) Inventor: Jacob Matthews, Alexandria, VA (US)

(73) Assignee: ZENO POWER SYSTEMS, INC., Alexandria, VA (US)

(*) Notice: Subject to any disclaimer, the term of this patent is extended or adjusted under 35 U.S.C. 154(b) by 436 days.

(21) Appl. No.: 17/124,121

(22) Filed: Dec. 16, 2020

(65) Prior Publication Data

US 2021/0391092 A1   Dec. 16, 2021

Related U.S. Application Data

(60) Provisional application No. 63/122,733, filed on Dec. 8, 2020, provisional application No. 62/948,479, filed on Dec. 16, 2019.

(51) Int. Cl.
| | | |
|---|---|---|
| *G21G 4/06* | (2006.01) | |
| *G21F 1/12* | (2006.01) | |
| *G21H 1/10* | (2006.01) | |

(52) U.S. Cl.
CPC ............. *G21G 4/06* (2013.01); *G21F 1/12* (2013.01); *G21H 1/103* (2013.01)

(58) Field of Classification Search
CPC ............ G21G 4/06; G21F 1/12; G21H 1/103
(Continued)

(56) References Cited

U.S. PATENT DOCUMENTS

| 3,165,475 A | 1/1965 | Amos et al. |
|---|---|---|
| 3,204,103 A | 8/1965 | Johnson et al. |

(Continued)

FOREIGN PATENT DOCUMENTS

| CN | 105540652 | 5/2016 |
|---|---|---|
| GB | 817895 | 8/1959 |

(Continued)

OTHER PUBLICATIONS

International Search Report and Written Opinion issued in corresponding PCT Patent Application No. PCT/US2020/065357, dated Jun. 9, 2021.

(Continued)

*Primary Examiner* — Nicole M Ippolito
(74) *Attorney, Agent, or Firm* — Pillsbury Winthrop Shaw Pittman LLP

(57) ABSTRACT

Provided is a fuel design configured to have a thickness that is equal to or less than a mean-free path of electrons emitted by a radioactive energy source to prevent electrons produced thereby from being stopped within the fuel design and thus decreasing the intensity of bremsstrahlung radiation generated within the fuel design. Additionally provided is a two-phase shielding system including a first shield formed of a first material having a thickness exceeding a mean-free path of an electron emitted from a radioactive source material so as to prevent the electron from passing through the first shield, and a second shield formed of a second material configured to prevent bremsstrahlung radiation generated by the electron from passing through the second shield.

36 Claims, 10 Drawing Sheets

(58) Field of Classification Search
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 3,230,374 | A | 1/1966 | Jones et al. |
| 3,330,889 | A | 7/1967 | Samos et al. |
| 3,331,784 | A | 7/1967 | Meyer et al. |
| 3,401,064 | A | 9/1968 | Milton et al. |
| 3,431,328 | A | 3/1969 | Case et al. |
| 3,451,641 | A | 6/1969 | Leventhal |
| 3,515,875 | A | 6/1970 | Keshisian |
| 3,621,261 | A | 11/1971 | Princiotta et al. |
| 3,663,306 | A | 5/1972 | Champs et al. |
| 3,697,329 | A | 10/1972 | Bunker et al. |
| 3,723,742 | A | 3/1973 | Aranguren et al. |
| 3,767,930 | A | 10/1973 | Sayell |
| 4,233,282 | A | 11/1980 | Arendt |
| 4,755,373 | A | 7/1988 | Gherardi et al. |
| 5,082,617 | A | 1/1992 | Walter et al. |
| 6,285,969 | B1 * | 9/2001 | Svatos ................ A61N 5/1031 703/2 |
| 6,613,303 | B1 | 9/2003 | Hess et al. |
| 7,147,834 | B2 | 12/2006 | Wong et al. |
| 9,169,128 | B2 | 10/2015 | Wu et al. |
| 2006/0131886 | A1 | 6/2006 | Luo et al. |
| 2013/0026919 | A1 * | 1/2013 | Rosener ............ H01J 37/32073 315/111.41 |
| 2014/0029727 | A1 * | 1/2014 | Ono ........................ H01J 35/32 378/121 |
| 2016/0225476 | A1 | 8/2016 | Choi et al. |
| 2019/0392961 | A1 * | 12/2019 | Choi ........................ G21G 1/12 |

FOREIGN PATENT DOCUMENTS

| | | |
|---|---|---|
| GB | 953963 | 2/1964 |
| WO | 2016138389 | 9/2016 |
| WO | 2020232507 A1 | 11/2020 |

OTHER PUBLICATIONS

International Preliminary Report on Patentability and Written Opinion issued in corresponding PCT Patent Application No. PCT/US2021/062360, dated Jul. 4, 2022.

International Preliminary Report on Patentability and Written Opinion issued in corresponding PCT Patent Application No. PCT/US2020/065357, dated Jun. 30, 2022.

SNAP 7B, Strontium-90 Fueled Thermoelectric Generated Power Source Thirty-Watt U.S. Coast Guard Automatic Light Station, TID-4500 (20th ED), Martin Company Nuclear Division, Martin Marietta Corporation, Jun. 1963, 101 pages.

Harris, Dale et al.: Properties of Selected Radioisotopes, NASA SP-7031, 1968, 189 pages.

International Search Report and Written Opinion issued in corresponding PCT Patent Application No. PCT/US2021/033875, dated Sep. 29, 2022.

* cited by examiner

300

400

FUEL DESIGN AND SHIELDING DESIGN FOR RADIOISOTOPE THERMOELECTRIC GENERATORS

CROSS-REFERENCE TO RELATED APPLICATIONS

This application claims the benefit of U.S. Provisional Patent Application No. 62/948,479, filed on Dec. 16, 2019, and U.S. Provisional Patent Application No. 63/122,733, filed on Dec. 8, 2020, the disclosures of which are each incorporated by reference in their entireties.

BACKGROUND

1. Field

The present disclosure relates generally to fuel designs and shielding power sources, and more specifically, to high-energy beta radiation sources.

2. Description of the Related Art

Radioisotope power systems (RPS) are devices that produce power by harnessing heat from decay of a concentrated mass of radioactive material. Radioisotope heater units (RHU) use this heat directly. Radioisotope thermoelectric generators (RTGs) convert heat produced from radioactive decay into electricity. RTGs are desirable as a compact, always-on, no maintenance source of power without need for refueling over periods of months to decades. The utility of an RPS depends on an availability and characteristics of radioisotopes used to fuel it. In general, the characteristics of plutonium-238 ($^{238}$Pu) are favorable for use as a radioisotope for RPS devices. However, plutonium-238 is very limited supply and making plutonium-238 impractical for most applications. Alternatives radioisotopes for RPS devices include high-energy beta emitting radioisotopes (e.g., strontium-90 ($^{90}$Sr)) or alpha-emitting radioisotopes (e.g., cesium-137 ($^{137}$Cs)), which have been used for RPSs in the past, but which are not optimal because of the need for heavy radiation shielding. RTGs are established devices used since the 1960s in applications where their specialized capabilities warranted their cost premium, such as for military purposes, space probes, etc. Previous versions of RTGs were used in scenarios (e.g., space probes) where minimal or no maintenance or human intervention was needed. These RTGs generally produced a few hundred watts or less of power, operated for relatively short durations of time, and/or were designs customized for a specific use. The fuel form and configuration of previous versions of RTGs were determined based on the radioisotope to be used and the application of the RTG. Many past RTG designs consisted of fuel capsules containing large diameter discs of Strontium Titanate (SrTiO$^3$) surrounded by large amounts of dense metals (e.g., lead (Pb)) or concrete.

Strontium-90 decays by beta emission into yttrium-90 ($^{90}$Y), which itself is a beta radiation source. The energy of the two betas are 541 keV and 2,270 keV. The initial strontium-90 half-life is 28.79 years with the yttrium-90 decay being only 64 hours. Yttrium-90 decays into stable zirconium-90 ($^{90}$Z). Beta particles (e.g., electrons or positrons), when slowed by interaction with matter through which they are moving, can produce bremsstrahlung radiation (x-rays). Bremsstrahlung radiation is a process whereby a charged particle, such as an electron, is decelerated, causing electromagnetic radiation (i.e., a photon) to be produced. To satisfy the law of conservation of energy, the energy of the photon will equal the energy of the charged particle prior to being decelerated minus the charged particle's energy after being decelerated (e.g., $E_\gamma = E(i)_{e-} - E(f)_{e-}$). Interaction with higher atomic number materials will cause a larger deceleration, which will increase the average energy of the x-rays when beta radiation interacts with the higher atomic number materials (e.g., incident with). This indicates that less dense materials are preferable for shielding these particles due to the decreased x-ray production. Like beta particles, the resulting bremsstrahlung x-rays technically have a range of energies up to a maximum energy equal to the maximum energy of the beta particle (assuming that the beta particle is completely stopped in the material). The x-ray energies can be high enough to require a considerable radiation shield layer to protect humans, animals, and equipment nearby.

Historical designs of $^{90}$Sr RTGs performed well for their given tasks. However, the heavy shielding of these RTGs limited their practical applications. These and/or other drawbacks exist.

SUMMARY

The following is a non-exhaustive listing of some aspects of the present techniques. These and other aspects are described in the following disclosure.

Some aspects include a fuel design that includes: a radioactive source material including a high-energy beta emitter, wherein: the fuel design is configured to have a thickness that is equal to or less than a mean-free path of electrons emitted by the radioactive source material such that an electron emitted by the radioactive source material as a result of a beta decay process is able to pass through the radioactive material without being stopped so as to prevent bremsstrahlung radiation from being generated within the fuel design.

Some other aspects include a system for shielding a radioactive source material that includes: a first shield formed of a first material having a thickness exceeding a mean-free path of an electron emitted from the radioactive source material so as to prevent the electron from passing through the first shield; and a second shield formed of a second material configured to prevent reduce an amount of bremsstrahlung radiation generated by the electron from passing through the second shield.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
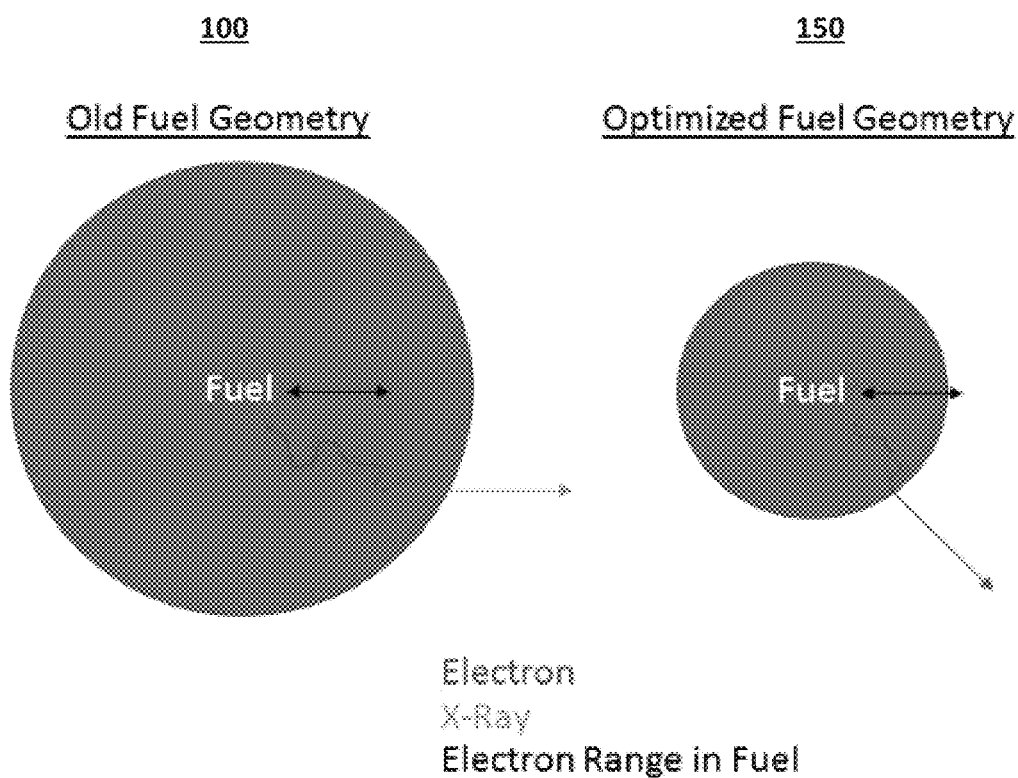
FIG. 1 illustrates an example of a historical fuel design geometry for a radioisotope thermoelectric generator (RTG) and an optimized fuel design geometry for an RTG, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not foreseen) by others in the field of radioisotope thermoelectric generators (RTGs). Indeed, the inventors wish to emphasize the difficulty of recognizing those problems. Further, because multiple problems are addressed, it should be understood that some embodiments are problem-specific, and not all embodiments address every problem with traditional systems described herein or provide every benefit described herein. That said, improvements that solve one or more permutations of these problems and/or other problem(s) are described below.

Power sources including high-energy beta emitting sources may be used to create radioisotope thermoelectric generators (RTGs). RTGs convert heat to electricity, which may then be output from the RTG to power various devices. Such devices may include, for example, batteries, satellites, unmanned facilities, solar panels, communications devices, lighting, motors, etc. The heat may be produced by the decay of a radioactive source material or combinations of different radioactive source materials. The decay process, for example, may include a radioactive element decaying to another element while outputting one or more particles. A radioactive element, as described herein, refers to an element that includes an unstable nuclei, where a number of protons and a number of neutrons in the nucleus is unbalanced. One type of radioactive decay is a beta decay, where an initially unstable atomic element decays to another element (stable or unstable) while outputting an electron or a position. A half-life, T, of a radioactive element indicates an amount of time for the unstable atomic element to decay to half of its initial value. Each radioactive isotope may have a different half-life, and these half-lives are generally well-known in scientific communities.

In some embodiments, an RTG may be formed that includes strontium-90 as its radioactive element. Strontium-90 includes 38 protons and 52 neutrons (e.g., 38+52=90). strontium-90 is an unstable strontium (Sr) isotope, having a half-life of 28.9 years. Strontium-90 decays to yttrium-90 via a beta decay, emitting a 546 keV electron. Yttrium-90 includes 39 protons and 51 neutrons (e.g., 39+51=90). Yttrium-90 is an unstable yttrium (Y) isotope, having a half-life of 64.1 hours. Yttrium-90 decays to Zirconium-90 via a beta decay, emitting a 2,280.1 keV (2.2801 MeV) electron. While the foregoing description relates generally to radioactive source materials including Strontium-90, in some embodiments, RTGs may be formed including other radioactive elements that produce high-energy beta radiation (e.g., beta radiation greater than 2 MeV). For example, strontium-89, plutonium-238, polonium-210, curium-244, or americium-241 are alternative radioisotopes that could be used instead of strontium-90.

RTGs, due to the radioactivity of the materials used, require some form of shielding for safety. Generally speaking, the goal of a shielding design, regardless of use-case, is to reduce the escape of radiation by interposing a material that interacts with that type of radiation to reduce the radiation's energy. One issue with high energy beta decay is that high energy x-rays result from the initial interaction(s) with shielding materials, and these x-rays can require considerable shielding in turn. Historical designs for shielding resulted in bremsstrahlung being produced before the beta radiation could escape the fuel (e.g., radioactive material) itself. However, fuel designs that reduce/eliminate bremsstrahlung radiation generated within the fuel itself have yet to be fabricated, particularly for larger activity energy sources. The historical fuel designs where bremsstrahlung radiation is produced within the fuel itself have only been possible by limiting the fuel to small amounts of strontium-90 and, even so, surrounding them with unwieldy shields. For instance, current strontium-90 radioactive power source designs use large-radius fuel designs even though it has been known since at least 1968 where virtually all bremsstrahlung x-rays are generated inside the fuel. Therefore, a shielding design that reduced bremsstrahlung radiation generation for large activity beta radiation sources has not been pursued because the x-ray generation had already occurred in the fuel. Consequently, to shield high-energy beta radiation sources and their associated bremsstrahlung x-ray generation required using large masses of heavy metals or concrete that severely constrained the applications (e.g., use cases) of such beta emitting RTGs.

Due to the need for large masses of metals or concrete for shielding, lightweight shielding of high-energy beta radiation sources was not practical for portable, terrestrial, or space use. This has limited the use of beta source RTGs to applications where either higher allowable radiation levels permit use of less shielding or where the large shield mass, volume, and cost are acceptable. A shielding design intended for portable use-cases outside of a remote environment requires the inherent safety mechanisms afforded by large masses of metals or concrete, while also being lightweight enough to be portable. Now, a confluence of factors warrants reassessing use of strontium-90 RTGs. Namely, a lack of alternative radioisotopes where strontium-90 would be in plentiful supply if nuclear fuel is reprocessed and the need for small amounts of unattended, reliable, long-term power to highly energy efficient devices being deployed where humans cannot go. One of the main driving forces in propelling the widespread use of RTGs is reducing the x-ray shield cost and weight.

FIG. 1 illustrates an example of a geometry 100 of a historical fuel design for a radioisotope thermoelectric generator (RTG) and a geometry 150 of an optimized fuel design for an RTG, in accordance with various embodiments. In some embodiments, geometry 150 for an optimized fuel design of an RTG may be crafted such that bremsstrahlung radiation generation may be reduced as compared to geometry 100 for the historical fuel design. For instance, geometry 150 of the optimized fuel design may reduce bremsstrahlung x-ray generation by allowing most high-energy beta radiation to escape from a fuel source. The fuel source of the optimized fuel design, for example, may be a high-energy beta emitter, such as Strontium-90.

As seen in FIG. 1, geometry 100 of the historical fuel design may have a radius that is greater than a mean free path of the fuel source's beta radiation. In this example, the electron produced via the beta decay of the radioactive source material is converted to bremsstrahlung radiation (e.g., an x-ray) within the fuel source (e.g., the fuel source of the historical fuel design). However, in some embodiments, geometry 150 of the optimized fuel design may have a radius that is less than the mean free path of the beta radiation, thereby allowing the beta radiation to escape from the fuel source (e.g., the fuel source of optimized fuel design) without first being converted to bremsstrahlung x-rays. After escaping the fuel source (e.g., the fuel source of optimized fuel design), the beta radiation may be decelerated within a material, such as a portion of a shielding, which may inhibit bremsstrahlung radiation generation. The material may be selected based on atomic number Z or effective atomic number, if a compound material. In some cases, the material may be a material with a low-density.

Figure 2:
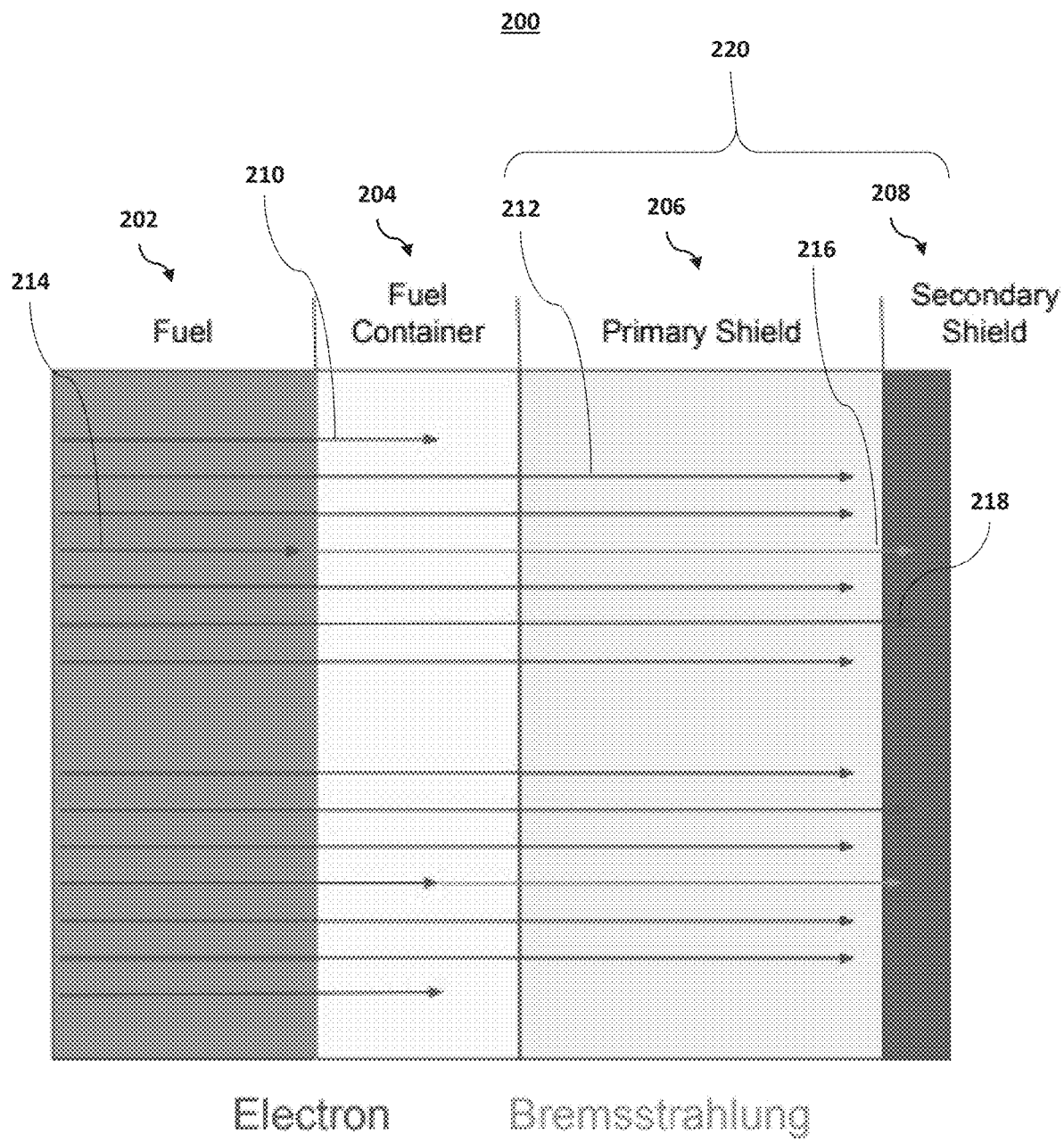
FIG. 2 illustrates an example of a two-phase shielding for an RTG, in accordance with various embodiments.

FIG. 2 illustrates an example of a two-phase shielding 220 for an RTG 200, in accordance with various embodiments. In some embodiments, RTG 200 may include a fuel 202, also referred to herein interchangeably as fuel source 202, a fuel container 204, and a two-phase shielding system 220, also referred to herein interchangeably as two-phase shielding 220, shielding 220, and/or system 220. Two-phase shielding system 220 may include a first shield 206 and a second shield 208. In some embodiments, first shield 206 may be referred to herein interchangeably as primary shield 206, and second shield 208 may be referred to herein interchangeably as secondary shield 208. Additionally, in some embodiments, RTG 200 may not include fuel container 204.

In some embodiments, two-phase shielding 220 may be designed to reduce bremsstrahlung radiation generation, minimize radiation outside RTG 200, and also provide structural stability for RTG 200. In some embodiments, first shield 206 may be formed of a material having a low effective atomic number. First shield 206 may be configured to attenuate at least some of the bremsstrahlung radiation that escapes fuel 202 and fuel container 204 (e.g., as seen in geometry 150 of FIG. 1). In some embodiments, second shield 208 may be formed of a material having a high effective atomic number. Second shield 208 may be configured to absorb bremsstrahlung radiation that escapes first shield 206 and/or is generated within first shield 206. Second shield 208 may also be configured to provide structural stability and ruggedness for two-phase shielding 220, thus also providing stability and ruggedness for RTG 200. In some embodiments, RTG 200 may be configured to operate at very high temperatures to maximize thermal efficiency.

For example, RTG 200 may be configured to operate at, or above, approximately 700-degrees Celsius. The temperature ranges for which RTG 200 may operate may range from approximately 50-degrees Celsius to the degradation temperature of the fuel (e.g., approximately 1400-degrees Celsius for $SrF_2$, 1800-degrees Celsius for SrTiO3). In some embodiments, RTG 200 may be configured to operate at low temperatures to simplify the thermal design and handling. Regardless, the geometry 150 can support a wide range of possible operating temperatures to best suit the application. In some embodiments, first shield 206 may serve to attenuate as much bremsstrahlung radiation as possible that escaped from fuel 202, or fuel 202 and fuel container 204. Additionally, first shield 206 may be designed to produce a minimal amount of bremsstrahlung radiation. In some embodiments, first shield 206 must be configured to act as a heat transfer medium to transfer heat between a heat source and a heat sink. First shield 206 may be formed of one or more materials. For example, first shield 206 may be formed of graphite, lithium hydride, hydrogenous oils or resins, molten salts, and the like. The one or more materials used to form first shield 206 may include materials having a low density, a low atomic number, high thermal conductivity, and/or high material degradation temperature, and may additionally or alternatively be a material that is compatible with a material (e.g., Strontium Titanate) including the radiation source to be used (e.g., Strontium-90).

In some embodiments, graphite may be selected as a material to be used for first shield 206 because graphite has a good thermal conductivity and a low effective atomic number of 6. Additionally, graphite has high chemical compatibility with other materials and has been used as a material compatibility buffer in previous RTG designs. The melting temperature of graphite is higher (e.g., 3,600 degrees Celsius) than a melting temperature of Strontium Titanate (e.g., 2,080 degrees Celsius), making it thermally stable. Graphite is also not toxic, relatively inexpensive, and is used for many existing nuclear applications.

In some embodiments, Lithium hydride or hydrogenous oils may be selected as a material to be used for first shield 206 because of their low densities, acceptable thermal conductivity, and low effective atomic numbers. For example, Lithium hydride has an effective atomic number of 1.5, while hydrogenous oil will be generally higher and dependent on the specific oil used. Both substances may be compatible with the other materials in the fuel design, though Lithium hydride is toxic, which may increase manufacturing cost and increase risks in the event of a loss of containment. While hydrogenous oils are relatively inexpensive, Lithium hydride is not. In some cases, the maximum temperature before degradation or boiling of both Lithium hydride and hydrogenous oils can limit the operating temperature of the fuel design. For example, Lithium hydride and hydrogenous oils can cause the operating temperature of RTG 200 to be below 700 degrees Celsius.

In some embodiments, a molten salt option, such as FLiBe (Li2BeF4), may be selected as a material to be used for first shield 206. The effective atomic number of the molten salt option is 3.3, representing a bremsstrahlung intensity reduction of approximately 87% compared to past strontium-90 designs. The density of the molten salt option is approximately 1.9 $g/cm^3$. The molten salt option has an acceptable thermal conductivity and can be made relatively inexpensively. Molten salts can be used as high temperature heat transfer medium for certain applications, such as, for example, central solar power stations, and has been planned for use in nuclear reactors.

In some embodiments, a thickness and material for second shield 208 are chosen to reduce remaining beta rays that escape first shield 206 to low enough values to allow handling and use. Second shield 208 may be configured to stop or absorb most bremsstrahlung radiation that may have been produced by fuel 202, fuel container 204, and/or primary shield 206 that was not attenuated by fuel container 204 or first shield 206. Second shield 208 may be formed of one or more materials, which may differ from the one or more materials of first shield 206. For instance, the one or more materials used to form second shield 208 may include materials having a high density, a high effective atomic number, high thermal conductivity, high material degradation temperature, as well as being a material that is compatible with other materials in RTG 200. As an example, second shield 208 may be formed of Tungsten, Lead, depleted Uranium, a combination thereof, or other materials. In some embodiments, combinations of Tungsten, Lead, and/or depleted Uranium may be used to control heat transfer.

In some embodiments, an electron 210 produced as a result of a radioactive decay (e.g., a beta decay) of a radioactive substance (e.g., Strontium-90) within fuel 202 may escape fuel 202 and be attenuated in fuel container 204. For instance, a radius of fuel 202 may be less than a mean free path of electronic 210, allowing electron 210 to escape fuel 202 without being converted into bremsstrahlung radiation. In some embodiments, an electron 212 produced as a result of a radioactive decay (e.g., a beta decay) of a radioactive substance (e.g., Strontium-90) within fuel 202 may escape fuel 202, pass through fuel container 204, and may be attenuated in first shield 206. In some embodiments, an electron 214 produced as a result of a radioactive decay (e.g., a beta decay) of a radioactive substance (e.g., Strontium-90) within fuel 202 may not escape fuel 202, and may be converted into bremsstrahlung radiation (e.g., an x-ray) 216. Bremsstrahlung radiation 216 may escape fuel 202, pass through fuel container 204 and first shield 206, and may be attenuated by second shield 208. In some embodiments, an electron 218 produced as a result of a radioactive decay (e.g., a beta decay) of a radioactive substance (e.g., Strontium-90) within fuel 202 may escape fuel 202, pass through fuel container 204 and first shield 206, and may be attenuated by second shield 208. Alternatively, an electron produced as a result of a radioactive decay (e.g., a beta decay) of a radioactive substance (e.g., Strontium-90) within fuel 202 may escape fuel 202, and be converted to bremsstrahlung radiation within fuel container 204, first shield 206, or second shield 208. Regardless of whether the bremsstrahlung radiation was produced within fuel container 204, first shield 206, or second shield 208, the bremsstrahlung radiation may be attenuated prior to arriving at, or by, second shield 208 so as to not escape RTG 200.

Many nuclear fuel designs may be contained in multiple levels of containment structures as an inherent safety element. However, some prior designs for fuel capsules included a single layer of containment. Some embodiments include a graduated containment structure to increase safety of the fuel design by reducing radiation exposure and loss of fuel containment if the shield is punctured or the containment is lost in some other way. Additionally, the graduated containment structure may provide lightweight attenuation for any bremsstrahlung radiation that is generated. In some embodiments, the graduated shielding may include geometric combinations making use of self-shielding, sectioning off of fuel into separate compartments, containing fuel such that the spread of fuel is limited if the shielding is impacted, and geometric designs that reduce radiation exposure under off-normal conditions.

In some embodiments, fuel designs are described herein that for a high-energy beta radiation emitter, such as strontium-90. As an example, the range (e.g., a mean-free path) of electrons in Strontium Titanate ($SrTiO^3$) may be approximately 2 mm. An electron produced within a Strontium Titanate source therefore could be stopped in approximately 2 mm of Strontium Titanate source material.

Figure 3:
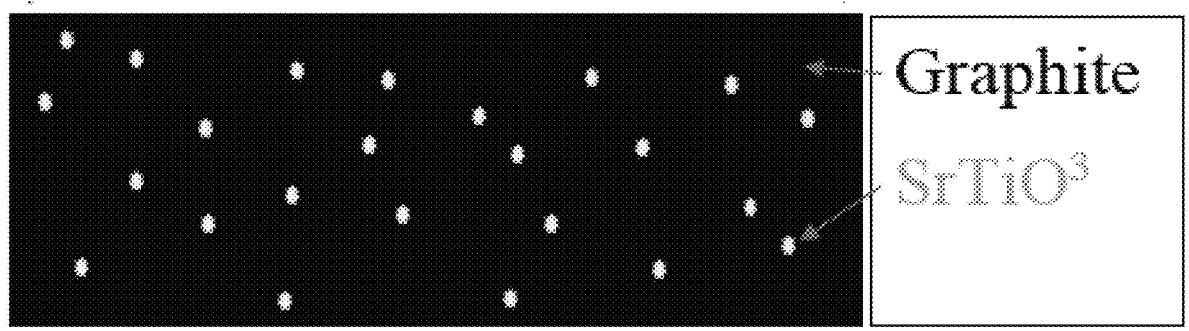
FIG. 3 illustrates an example of a dispersed fuel design for an RTG, in accordance with various embodiments.

FIG. 3 illustrates an example of a dispersed fuel design 300 for an RTG, in accordance with various embodiments. In some embodiments, fuel design 300 may include dispersed spherical structures formed of the high-energy beta radiation emitter. The spherical structures may be (i) of a substantially same size and (ii) substantially spherical. For instance, a volume V of each sphere may be equal to $4/3\pi r^3$, where "r" corresponds to a radius of a given spherical structure. Each spherical structure's volume may be within a predetermined tolerance level. For example, each spherical structure may have a volume V that within N standard deviations $\sigma$ of an average spherical structure volume. Spherical structures having a volume greater than $V+N\sigma$ or less than $V-N\sigma$ may be excluded from fuel design 300. Furthermore, each spherical structure may have a radius, r, that is substantially constant throughout its volume.

In some embodiments, each spherical structure may have a radius that is equal to or less than 2 mm, corresponding to a range of electrons produced by a beta decay of strontium-90. In some embodiments, each spherical structure may be formed of Strontium Titanate and may be coated with graphite. In some embodiments, the spherical structures may be dispersed in the primary shield (e.g., first shield 206) and may also be sintered or hot pressed together and encased in the secondary shield (e.g., second shield 208).

Figure 4:
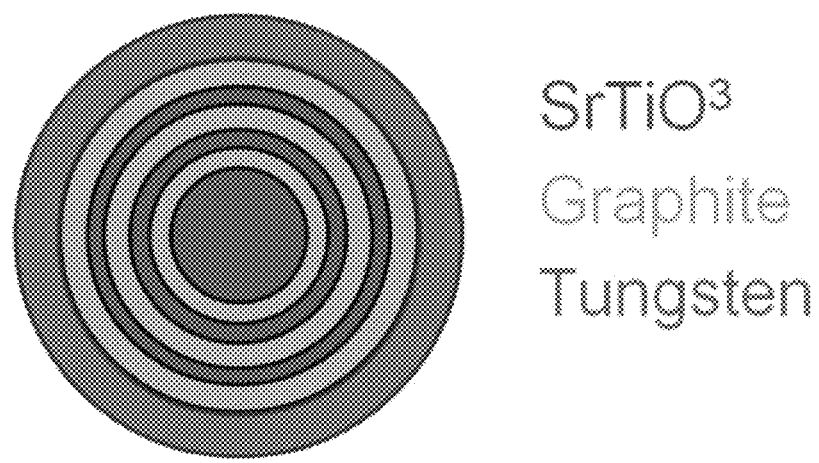
FIG. 4 illustrates an example of a concentric fuel design for an RTG, in accordance with various embodiments.

FIG. 4 illustrates an example of a concentric fuel design 400 for an RTG, in accordance with various embodiments. In some embodiments, concentric fuel design 400 may include concentric cylinders of a high-energy beta radiation emitter having a thickness less than the mean free path of the high-energy beta radiation emitter. For example, concentric fuel design 400 may include concentric cylinders of Strontium Titanate having a thickness of 2 mm. In some embodiments, concentric fuel design 400 may further include concentric cylinders of a first shielding material, such as graphite. For example, concentric fuel design 400 may include a first cylinder of Strontium Titanate having a first radius, encased by a cylinder of graphite having a thickness, encased by another cylinder of Strontium Titanate, encased by another cylinder of graphite, and so on. In some embodiments, the first radius may be less than 2 mm (e.g., the mean free path of electrons emitted by Strontium Titanate). In some embodiments, the thickness of the cylinder of graphite may be 7 mm or less. In some embodiments, an average distance between particles of strontium-90 may be approximately 0.005 cm. The number of cylinders of the radioactive source material and the number of cylinders of the first shielding material may vary and may depend on the power output a given fuel design is to produce. For example, the number of cylinders may be 6 or more (e.g., 3 cylinders of Strontium Titanate and 3 cylinders of graphite), 10 or more (e.g., 5 cylinders of Strontium Titanate and 5 cylinders of graphite), etc. In some embodiments, the concentric cylinders of the high-energy beta radiation emitter (e.g., Strontium Titanate) and the first shielding material (e.g., Graphite) may be encased in a second shielding material, such as Tungsten. The thickness may be selected such that radiation exposure from the RTG will be less than a threshold amount of radiation exposure (e.g., less than 10 mrem/hr at 1 meter away).

Figure 5A:
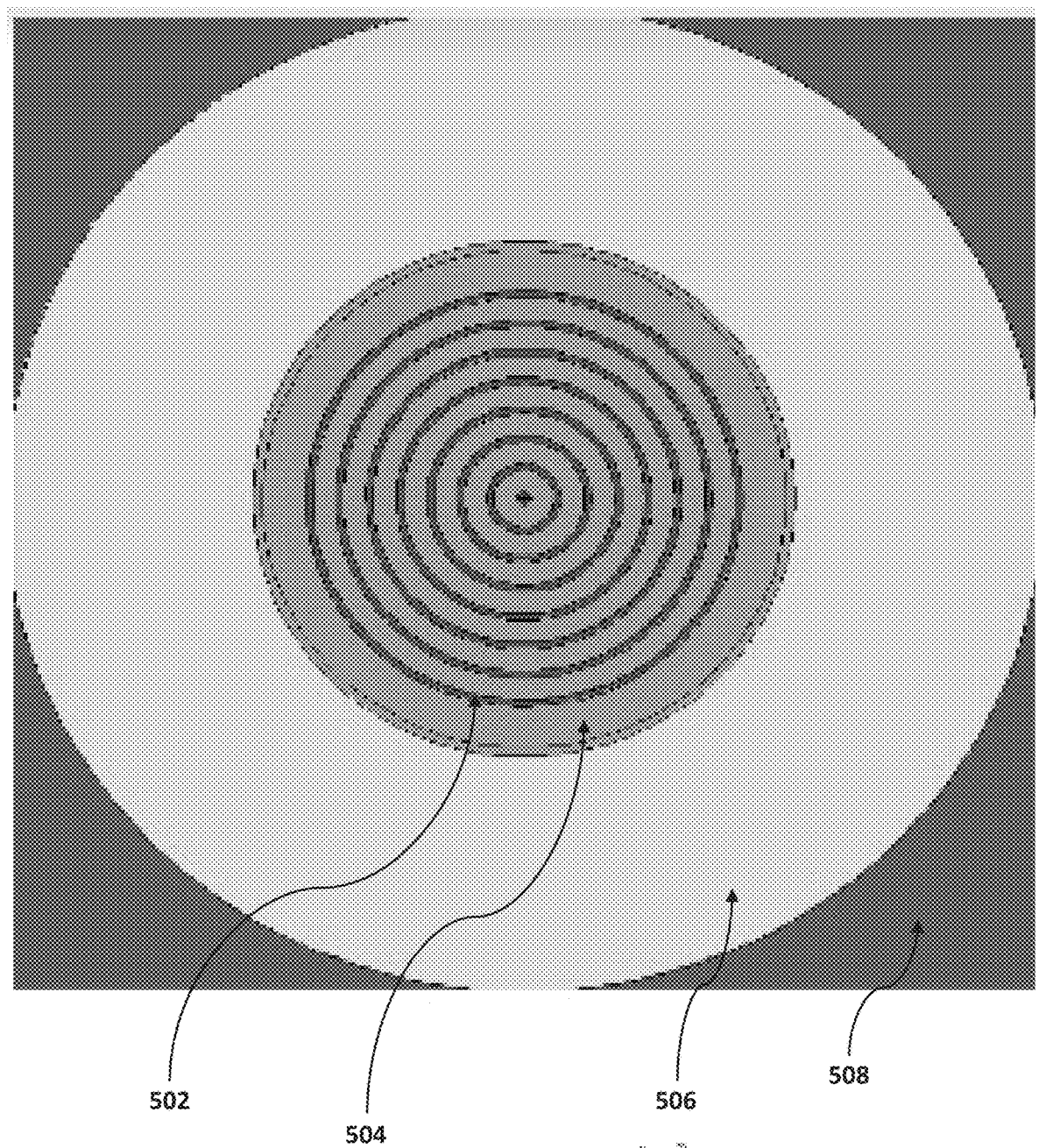
FIG. 5A illustrates another example of a concentric fuel design for an RTG, in accordance with various embodiments.
Figure 5B:
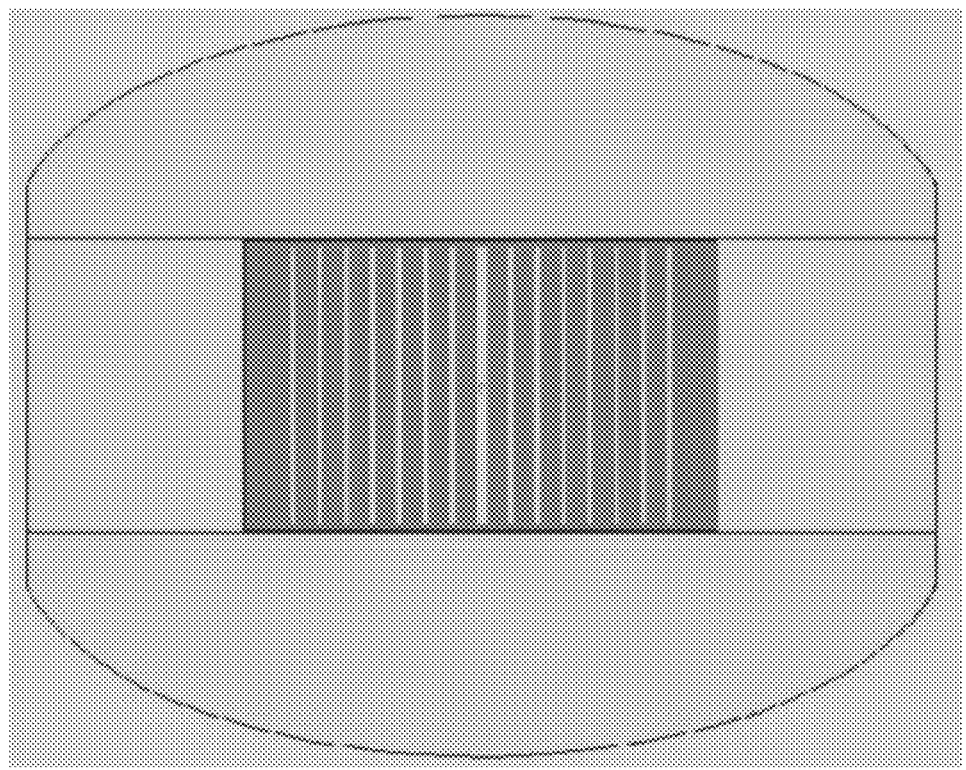
FIGS. 5B and 5C illustrate a side view and a top view, respectively of an example of a concentric fuel design for an RTG, in accordance with various embodiments.
Figure 5C:
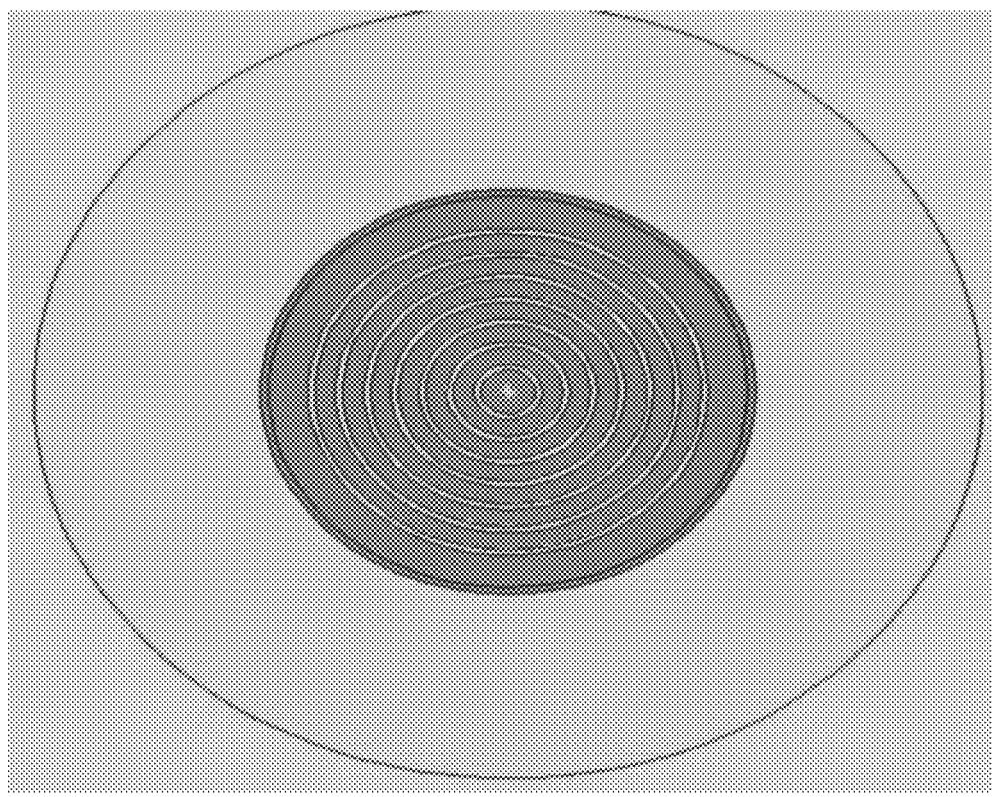

FIG. 5A illustrates another example of a concentric fuel design 500 for an RTG, in accordance with various embodiments. FIGS. 5B and 5C illustrate a side view and a top view, respectively, of an example of a concentric fuel design for RTG 500, in accordance with various embodiments. In some embodiments, concentric fuel design 500 may be similar to concentric fuel design 400 of FIG. 4, and the previous description may apply. Concentric fuel design 500 may include first concentric cylinders 502 of a high-energy beta emitter, such a strontium-90. For example, first concentric cylinders 502 may be formed of Strontium Titanate. First concentric cylinders 502 may be interposed with second concentric cylinders 504. Second concentric cylinders 504 may, in some embodiments, form a first, or primary, shield. For example, second concentric cylinders 504 may be similar to first shield 206 of FIG. 2. In some embodiments, second concentric cylinders 504 may be formed of one or more materials having a low density, a low atomic number, high thermal conductivity, high material degradation temperature, as well as being a material that is compatible with the radiation source to be used (e.g., strontium-90). For example, second concentric cylinders 504 may be formed of graphite.

In some embodiments, a central cylinder of first concentric cylinders 502 may be surrounded by a first instance of second concentric cylinders 504. The first instance of second concentric cylinder 504 may be sandwiched between a first instance of first concentric cylinder 502. This alternating pattern of first concentric cylinders 502 and second concentric cylinders 504 may be repeated a number of times depending on the power requirements of the RTG. However, an outer cylinder of fuel design 500 will be formed of second concentric cylinder 504. In some embodiments, a thickness of each concentric cylinder 502 and 504 may be substantially similar. For example, concentric cylinders 502 and 504 may both have a thickness that is equal to or less than 1 mm, 1.5 mm, 2 mm, 2.5 mm, 3 mm, etc. As another example, concentric cylinders 502 and 504 may both have a same thickness in a range of 1-10 mm. In some embodiments, a thickness of each concentric cylinders 502 may be substantially similar to one another, and a thickness of each concentric cylinder 504 may be substantially similar to one another but different than that of concentric cylinders 502. For example, concentric cylinders 502 and 504 may each have a thickness that is equal to or less than one of 1 mm, 1.5 mm, 2 mm, 2.5 mm, 3 mm, etc. As another example, concentric cylinders 502 and 504 may each have a thickness in a range of 1-10 mm. In some embodiments, a radius of each concentric cylinder 502 and each concentric cylinder 504 may increase as the number of cylinders increases (e.g., an inner cylinder may have a smaller radius than an outer cylinder). For example, a first concentric cylinder 502 may have a first radius, and first concentric cylinder 502 may be surrounded by a first concentric cylinder 504 having a second radius that is greater than the first radius. First concentric cylinder 504 may be surrounded by a second concentric cylinder 502 having a third radius that is greater than the second radius, and so on. The radius may gradually increase, for example, starting at 2 mm. The second radius may be one selected in a range of 2-4 mm, 2.5-4.5 mm, 2-6 mm, etc., and the third radius may be selected in a range of 4-6 mm, 4.5-6.5 mm, 4-7 mm, etc.

In some embodiments, third cylinder 506 may surround concentric cylinders 502 and 504. Third cylinder 506 may be substantially similar to second shield 208 of FIG. 2, and the previous description may apply. In some embodiments, third cylinder 506 may be formed of one or more materials a high density, a high effective atomic number, high thermal conductivity, high material degradation temperature, as well as being a material that is compatible with other materials in the RTG. For example, third cylinder 506 may be formed of Tungsten. In some embodiments, a thickness of third cylinder 506 may be dependent on design requirements of the RTG (e.g., power requirements, a number of instances of first shield, a material composition, etc.). In some embodiments, third cylinder 506 may be encompassed by a layer 508 of air, or may be exposed to the natural environment.

Figure 6A:
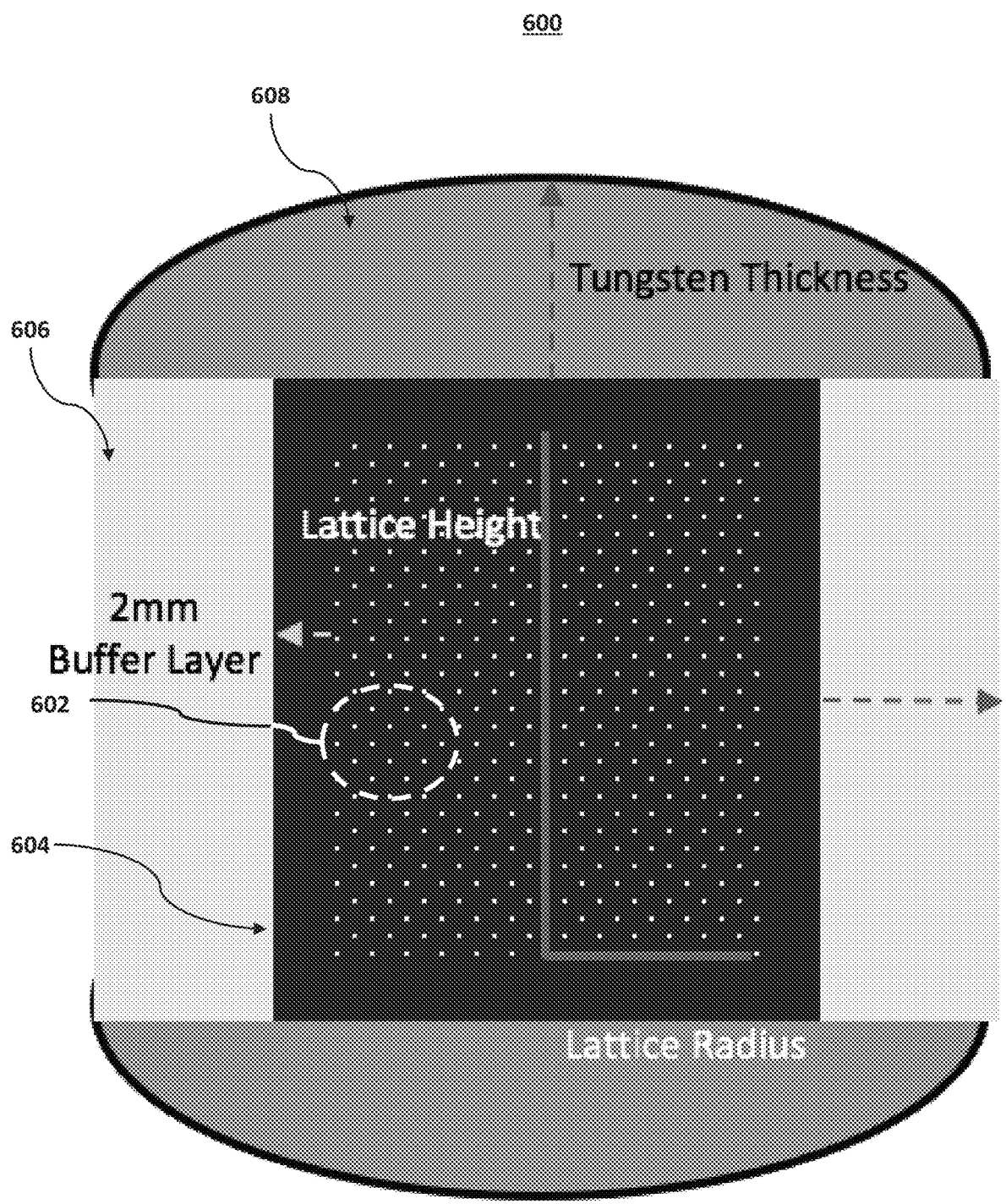
FIG. 6A illustrates another example of a dispersed fuel design for an RTG, in accordance with various embodiments.
Figure 6B:
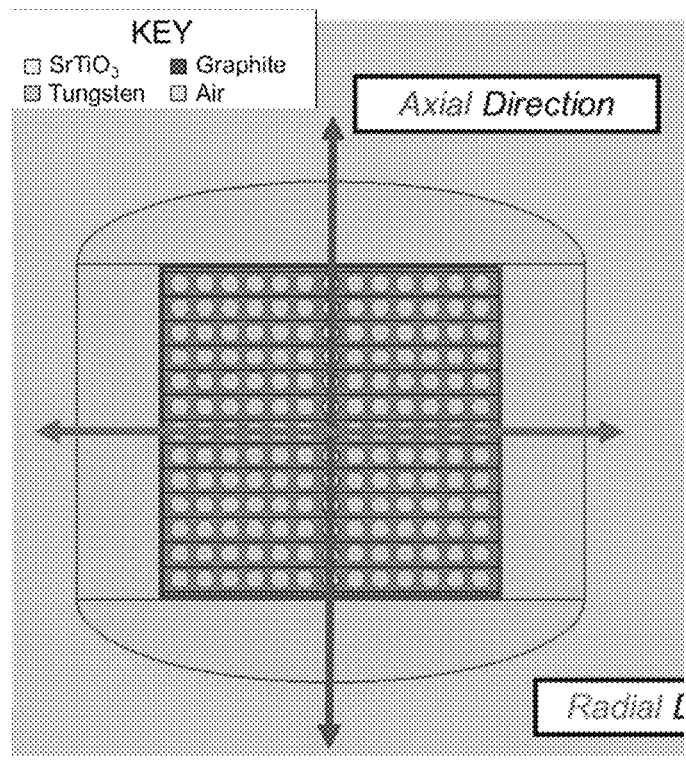
FIGS. 6B and 6C illustrate a side view and a top view, respectively, of an example of a dispersed fuel design for an RTG, in accordance with various embodiments.
Figure 6C:
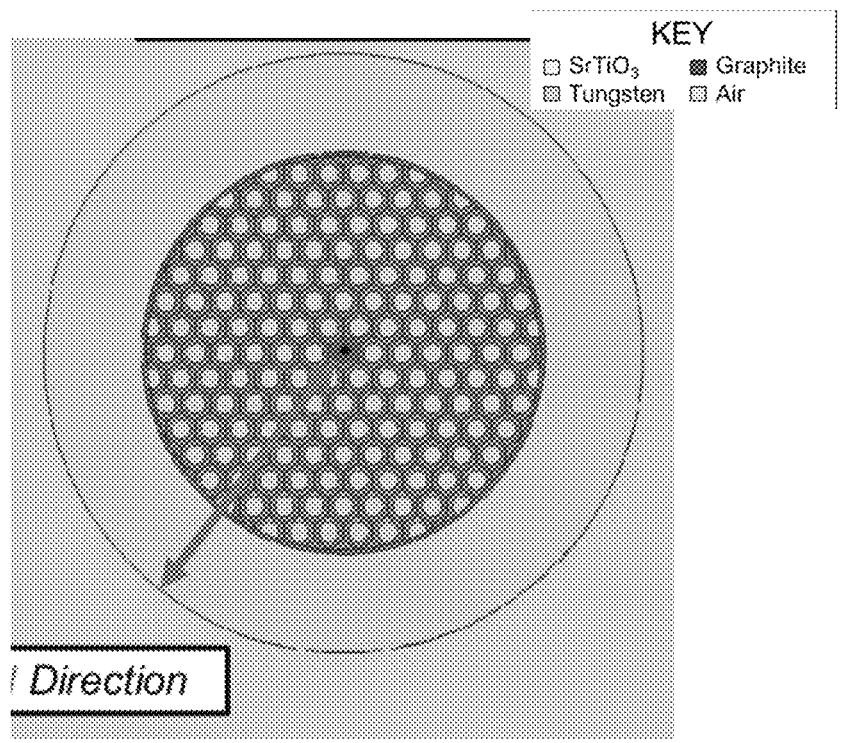

FIG. 6A illustrates another example of a dispersed fuel design for an RTG 600, in accordance with various embodiments. FIGS. 6B and 6C illustrate a side view and a top view, respectively, of an example of a dispersed fuel design for RTG 600, in accordance with various embodiments RTG 600 may include dispersed spherical structures 602 formed of the high-energy beta radiation emitter. The spherical structures may be (i) of a substantially same size and (ii) substantially spherical. For example, the spherical structures may be the same or similar to the spherical structures described above with references to FIG. 3. In some embodiments, each spherical structure may have a radius that is equal to or less than 2 mm, corresponding to a range of electrons produced by a beta decay of Strontium-90. In some embodiments, each spherical structure may be formed of Strontium Titanate and may be coated with graphite. In some embodiments, the spherical structures may be dispersed in a first shield 604. For example, first shield 604 may be formed of one or more materials having a low density, a low atomic number, high thermal conductivity, and/or high material degradation temperature, and may additionally or alternatively be a material that is compatible with a material (e.g., Strontium Titanate) including the radiation source to be used (e.g. Strontium-90). As an example, first shield 604 may be formed of graphite. In some embodiments, first shield 604 may include a buffer layer between a portion including spherical structures 602, and second shields 606 and 608. The Purpose of this buffer layer is to prevent any spherical structures 602 from contacting the second shields 606 and 608 and generating high-intensity bremsstrahlung.

Second shields 606 and 608 may each be formed of one or more materials having a high density, a high effective atomic number, high thermal conductivity, high material degradation temperature, as well as being a material that is compatible with other materials in RTG 200. As an example, second shields 606 and 608 may be formed of tungsten. In some embodiment, second shield 606 may have a first thickness and second shield 608 may have a second thickness. For example, the thickness of second shield 606 may be 5 mm and the thickness of second shield 608 may be 10 mm. Each of second shields 606 and 608 may have a thickness selected from within a range of thickness. The thickness is selected such that radiation exposure from the RTG will be less than a threshold amount of radiation exposure. For example, the thickness of the second shield may be selected such that the radiation exposure is less than 10 mrem/hr at 1 meter away. In some embodiments, second shield 606 may be substantially constant in thickness. For example, second shield 606 may be a sidewall of RTG 600 having a substantially constant thickness (e.g. selected as being a value within a range of 2-10 cm). In some embodiments, second shield 608 may have a varying thickness, whereby the thickness proximate to a perimeter of RTG 600 is less than a thickness along a central axis of RTG 600 (e.g., selected as being a value within a range of 2-10 cm).

Figure 7:
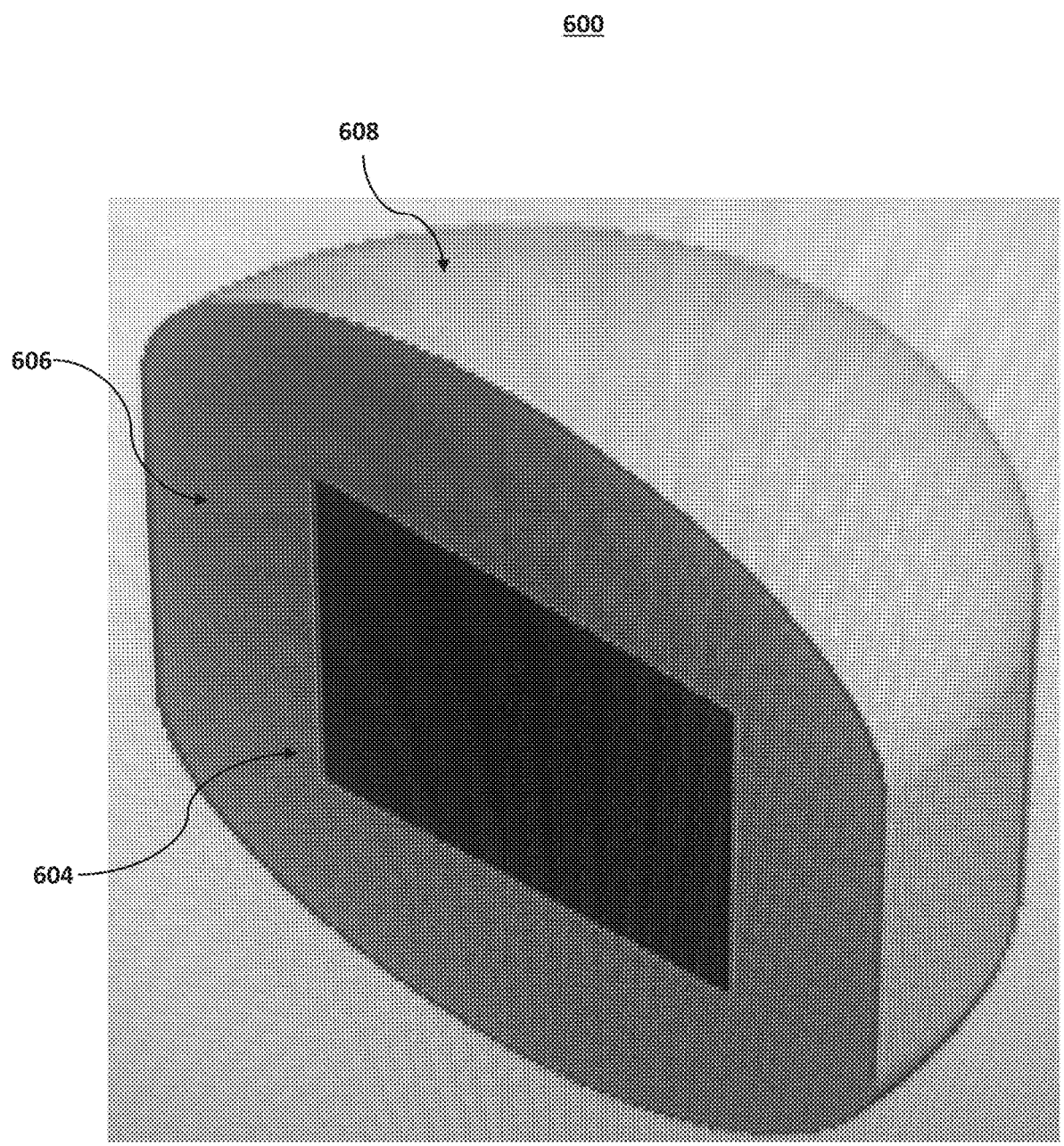
FIG. 7 illustrates an example of a cross-sectional view of a fuel design for an RTG, in accordance with various embodiments.

FIG. 7 illustrates a perspective view of the dispersed fuel design for an RTG of FIG. 6, in accordance with various embodiments. As seen from FIG. 7, RTG 600—described in detail in FIG. 6 above, is shown. In FIG. 7, a perspective view of RTG 600 is depicted.

Figure 8:
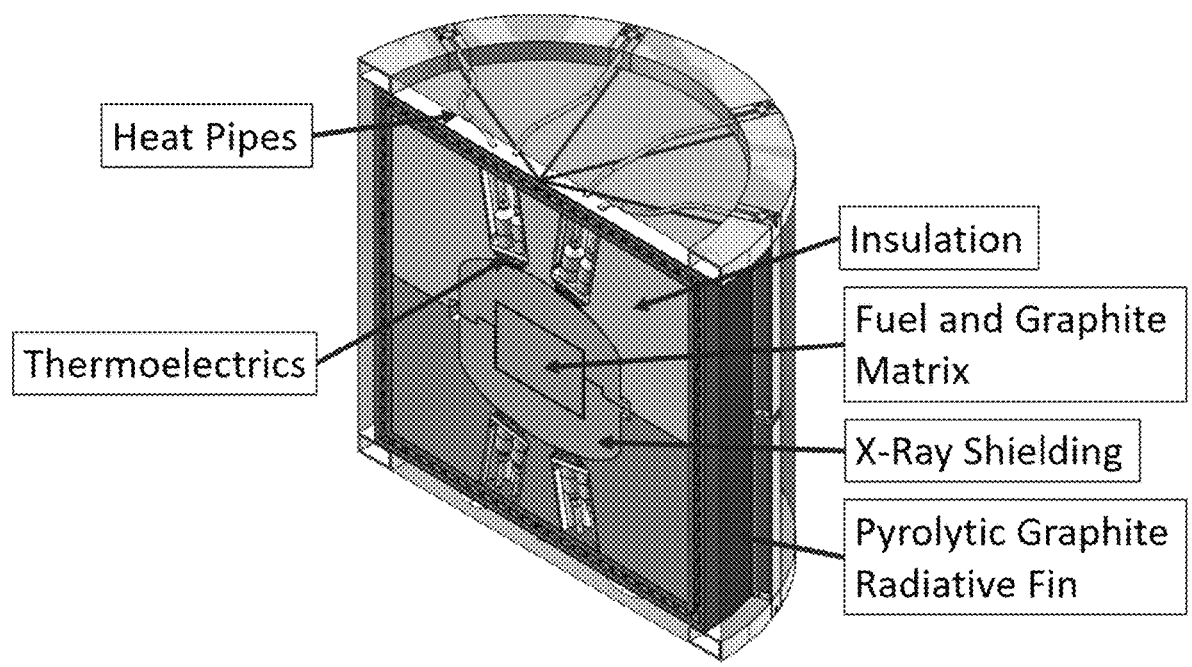
FIG. 8 illustrates another example of a cross-sectional view of a fuel design for an RTG, in accordance with various embodiments.

FIG. 8 illustrates another example of a cross-sectional view of a fuel design for an RTG, in accordance with various embodiments. As seen in FIG. 8, the RTG includes heat pipes, thermoelectric, insulation, fuel (e.g., Strontium Titanate) and graphite matrix, x-ray shielding, and a pyrolytic graphite radiative fin. In some embodiments, the fuel design of FIG. 8 depicts an example of how the heat source can be incorporated into an RTG designed for space applications.

Figure 9:
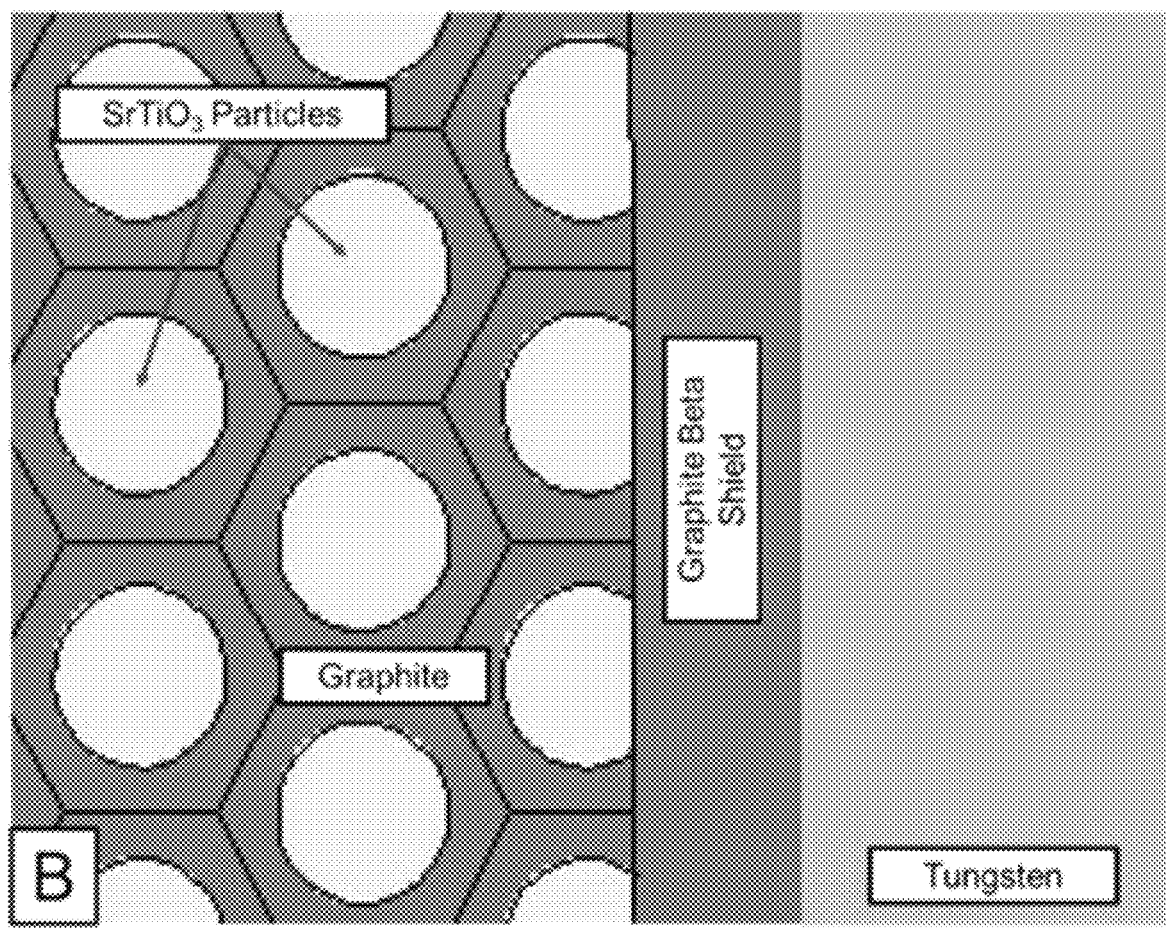
FIG. 9 illustrates an example of a zoomed-in region of an interface of a radioactive source material and shielding of a fuel design for an RTG, in accordance with various embodiments.

FIG. 9 illustrates an example of a zoomed-in region of an interface of a radioactive source material and shielding of a fuel design for an RTG, in accordance with various embodiments. As seen in FIG. 9, Strontium Titanate particles are encapsulated in graphite, and the graphite and particle combination are dispersed within the fuel. At an edge of the fuel, in some embodiments, may be a graphite beta shield. The graphite beta shield may be sandwiched between the graphite/particle combination and a tungsten layer of shielding. The graphite beta shield can prevent a Strontium Titanate particle from being directly on the high atomic number, tungsten shield which can result in high-intensity bremsstrahlung generation.

In some embodiments, the fuel designs described herein may be used for a variety of applications including, but not limited to, heater units for space environments, heater units for cold environments, thermal power sources for energy conversion, medical radioisotope storage shielding, spent nuclear fuel transportation shielding, medical radioisotope transportation shielding, spent nuclear fuel shielding, emergency radiation containment, biological radiation protection for space environments, and biological radiation protection for emergency radiation environments.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:
1. A fuel design, comprising: a radioactive source material comprising a high-energy beta emitter, wherein: the fuel design is configured to have a thickness that is equal to or less than a mean-free path of electrons emitted by the radioactive source material such that an electron emitted by the radioactive source material as a result of a beta decay process is able to pass through the fuel design without being stopped so as to prevent bremsstrahlung radiation from being generated within the fuel design.
2. The fuel design of embodiment 1, wherein the radioactive source material comprises Strontium Titanate.
3. The fuel design of any of embodiments 1-2, wherein the high-energy beta emitter comprises Strontium-90.
4. The fuel design of any of embodiments 1-3, wherein: the mean-free path of electrons emitted by the radioactive energy source comprises 2 millimeters (mm); and the thickness of the fuel design comprises 2 mm or less.
5. The fuel design of any of embodiments 1-4, wherein an energy of the electron emitted by the radioactive source material as a result of the beta decay process comprises 2 MeV.
6. The fuel design of any of embodiments 1-5, wherein the radioactive source material comprises a decay activity of 10 Curie or more, 50 Ci or more, or 100 Ci or more.
7. The fuel design of any of embodiments 1-6, wherein the radioactive source material is formed of spherical structures having the thickness, the spherical structures being dispersed in a first material.
8. The fuel design of embodiment 7, wherein the first material has a low density, a low atomic number, high thermal conductivity, high material degradation temperature, and is compatible with the radioactive source material.
9. The fuel design of any of embodiments embodiment 7-8, wherein the first material comprises graphite.
10. The fuel design of any of embodiments 7-9, wherein the first material comprises graphite, lithium hydride, hydrogenous oils or resins, or molten salt.
11. The fuel design of any of embodiments 7-10, wherein the first material, including the spherical structures formed of the radioactive source material dispersed therein, is further encased in a second material.
12. The fuel design of embodiment 11, wherein the second material has a high density, a high effective atomic number, high thermal conductivity, high material degradation temperature, and is compatible with other materials associated with the fuel design.
13. The fuel design of any of embodiments 11-12, wherein the second material comprises graphite.
14. The fuel design of any of embodiments 11-13, wherein the second material comprises tungsten, lead or depleted uranium.
15. The fuel design of any of embodiments 1-14, wherein the radioactive source material is formed of a first plurality of cylinders.
16. The fuel design of embodiment 15, further comprising: a second plurality of cylinders formed of a first material, wherein the first plurality of cylinders and the second plurality of cylinders are concentric cylinders.
17. The fuel design of any of embodiments 15-16, wherein the first material comprises graphite, lithium hydride, hydrogenous oils or resins, or molten salt.
18. The fuel design of any of embodiments 15-17, further comprising: a third cylinder, formed of a second material, configured to encase the first plurality of cylinders and the second plurality of cylinders.
19. The fuel design of embodiment 18, wherein the second material comprises tungsten, lead, or depleted uranium.
20. The fuel design of any of embodiments 18-19, wherein the first plurality of cylinders each have the thickness, the thickness being 2 mm, the second plurality of cylinders each have an additional thickness of at least 7 mm or less, and an average distance between particles of the first material is approximately 0.005 cm.
21. A system for shielding a radioactive source material, the system comprising: a first shield formed of a first material having a thickness exceeding a mean-free path of an electron emitted from the radioactive source material so as to prevent the electron from passing through the first shield; and a second shield formed of a second material configured to prevent bremsstrahlung radiation generated by the electron from passing through the second shield.
22. The system of embodiment 21, wherein: the first material has a low density, a low atomic number, high thermal conductivity, high material degradation temperature, and is compatible with the radioactive source material; and the second material has a high density, a high effective atomic number, high thermal conductivity, high material degradation temperature, and is compatible with other materials associated with the system.
23. The system of any of embodiments 21-22, wherein: the first material comprises graphite, lithium hydride, hydrogenous oils or resins, or molten salt; and the second material comprises tungsten, lead, depleted uranium, tantalum, osmium, or silicon carbide.
24. The system of any of embodiments 21-23, wherein: the mean-free path of the electron emitted from the radioactive source material is 2 millimeters (2 mm), the thickness of the first material is equal to or less than 2 mm; a thickness of the second material is equal to approximately 7 mm or less; and an average distance between particles of the first material is approximately 0.005 cm.

25. The system of any of embodiments 21-24, wherein the electron emitted from the radioactive source material has an energy of approximately 2 MeV, the thickness is selected such that the electron is prevent from passing through the first shield.

26. The system of any of embodiments 21-25, further comprising: a fuel source comprising the radioactive source material; and a fuel container configured to house the fuel source, wherein the first shield is configured to encase the fuel container, and the second shield is configured to encase the first shield.

27. The system of embodiment 26, wherein: the fuel source comprises Strontium Titanate; and the radioactive source material comprises Strontium-90.

28. The system of any of embodiments 26-27, wherein the radioactive source material comprises a high-energy beta emitter.

29. The system of any of embodiments 21-28, wherein the bremsstrahlung radiation generated by the electron is generated in the first shield, and the bremsstrahlung radiation generated in the first shield is attenuated in the first shield or the second shield.

30. The system of any of embodiments 21-29, wherein the bremsstrahlung radiation generated by the electron is generated in a fuel container configured to house a fuel source comprising the radioactive source material, the bremsstrahlung radiation generated in the fuel container is attenuated in the first shield or the second shield.

31. The system of any of embodiments 21-30, further comprising: a fuel design, comprising: a radioactive source material comprising a high-energy beta emitter, wherein: the fuel design is configured to have a thickness that is equal to or less than the mean-free path, and electrons emitted by the radioactive source material as a result of a beta decay process are able to pass through the fuel design without being stopped so as to prevent bremsstrahlung radiation from being generated within the fuel design.

32. The system of any of embodiments 21-31, wherein: the radioactive source material comprises Strontium Titanate; the high-energy beta emitter comprises Strontium-90; the mean-free path of electrons emitted by the radioactive energy source comprises 2 millimeters (mm); the thickness of the fuel design comprises 2 mm or less; and the thickness of the first shield is greater than 2 mm.

33. The system of any of embodiments 21-32, wherein the radioactive source material is formed of spherical structures having the thickness, the spherical structures being dispersed in the first shield, and the second shield being configured to encase the first shield including the spherical structures dispersed therein.

34. The system of any of embodiments 21-33, wherein the fuel design comprises a first plurality of cylinders and the first shield comprises a second plurality of cylinders, wherein the first plurality of cylinders and the second plurality of cylinders are concentric.

35. The system of embodiment 34, wherein the second shield comprises a cylinder configured to encase the first plurality of cylinders and the second plurality of cylinders.

36. The system of any of embodiments 34-34, wherein the first plurality of cylinders each have the thickness, the thickness being 2 mm; the second plurality of cylinders each have an additional thickness of at least 7 mm or less; and an average distance between particles of the first material is approximately 0.005 cm.

37. A method of forming the fuel design of any of embodiments 1-20, wherein the method comprises: selecting the radioactive source material to be used; obtaining an amount of the radioactive source material for producing energy of a predetermined amount; forming the fuel design based on the thickness of the mean-free path of the electrons emitted by the radioactive source material, wherein the fuel design comprises the thickness to allow the electron emitted by the beta decay process to pass through the fuel design without being stopped so as to prevent bremsstrahlung radiation from being generated within the fuel design.

38. A method of forming the system of any of embodiments 21-36, wherein the method comprises: selecting the radioactive source material to be used; obtaining an amount of the radioactive source material for producing energy of a predetermined amount; selecting a first material to be used to form a first shield for shielding the radioactive source material, wherein a thickness of the first material is determined based on a mean-free path of an electron emitted from the radioactive source material, the thickness exceeding the mean-free path of the electron so as to prevent the electron from passing through the first shield; selecting a second material to be used to form a second shield for shielding the radioactive source material, wherein the second shield is configured to prevent bremsstrahlung radiation generated by the electron from passing through the second shield; and forming a two-phase shield for a radioactive source including the first shield and the second shield, wherein the radioactive source material is dispersed within the first material of the first shield or is formed in concentric cylinders with the first shield, and the second shield encases the first shield.

What is claimed is:

1. A fuel design, comprising:
a radioactive source material comprising a high-energy beta emitter, wherein:
the fuel design is configured to have a thickness that is equal to or less than a mean-free path of electrons emitted by the radioactive source material such that an electron emitted by the radioactive source material as a result of a beta decay process is able to pass through the fuel design without being stopped so as to prevent bremsstrahlung radiation from being generated within the fuel design.

2. The fuel design of claim 1, wherein the radioactive source material comprises Strontium Titanate.

3. The fuel design of claim 1, wherein the high-energy beta emitter comprises Strontium-90.

4. The fuel design of claim 1, wherein:
the mean-free path of electrons emitted by the radioactive energy source comprises 2 millimeters (mm); and
the thickness of the fuel design comprises 2 mm or less.

5. The fuel design of claim 1, wherein an energy of the electron emitted by the radioactive source material as a result of the beta decay process comprises 2 MeV.

6. The fuel design of claim 1, wherein the radioactive source material comprises a decay activity of 100 Curie (Ci) or more.

7. The fuel design of claim 1, wherein the radioactive source material is formed of spherical structures having the thickness, the spherical structures being dispersed in a first material.

8. The fuel design of claim 7, wherein the first material has a low density, a low atomic number, high thermal conductivity, high material degradation temperature, and is compatible with the radioactive source material.

9. The fuel design of claim 7, wherein the first material comprises graphite.

10. The fuel design of claim 7, wherein the first material comprises lithium hydride, hydrogenous oils or resins, or molten salt.

11. The fuel design of claim 7, wherein the first material, including the spherical structures formed of the radioactive source material dispersed therein, is further encased in a second material.

12. The fuel design of claim 11, wherein the second material has a high density, a high effective atomic number, high thermal conductivity, high material degradation temperature, and is compatible with other materials associated with the fuel design.

13. The fuel design of claim 11, wherein the second material comprises graphite.

14. The fuel design of claim 11, wherein the second material comprises lead or depleted uranium.

15. The fuel design of claim 1, wherein the radioactive source material is formed of a first plurality of cylinders.

16. The fuel design of claim 15, further comprising:
a second plurality of cylinders formed of a first material, wherein the first plurality of cylinders and the second plurality of cylinders are concentric cylinders.

17. The fuel design of claim 16, wherein the first material comprises graphite, lithium hydride, hydrogenous oils or resins, or molten salt.

18. The fuel design of claim 15, further comprising:
a third cylinder, formed of a second material, configured to encase the first plurality of cylinders and the second plurality of cylinders.

19. The fuel design of claim 18, wherein the second material comprises tungsten, lead, or depleted uranium.

20. The fuel design of claim 18, wherein the first plurality of cylinders each have the thickness, the thickness being 2 mm.

21. A system for shielding a radioactive source material, the system comprising:
a first shield formed of a first material having a thickness exceeding a mean-free path of an electron emitted from the radioactive source material so as to prevent the electron from passing through the first shield; and
a second shield formed of a second material configured to prevent bremsstrahlung radiation generated by the electron from passing through the second shield.

22. The system of claim 21, wherein:
the first material has a low density, a low atomic number, high thermal conductivity, high material degradation temperature, and is compatible with the radioactive source material; and
the second material has a high density, a high effective atomic number, high thermal conductivity, high material degradation temperature, and is compatible with other materials associated with the system.

23. The system of claim 22, wherein:
the first material comprises graphite, lithium hydride, hydrogenous oils or resins, or molten salt; and
the second material comprises tungsten, lead, or depleted uranium.

24. The system of claim 21, wherein:
the mean-free path of the electron emitted from the radioactive source material is 2 millimeters (2 mm), the thickness of the first material is equal to or less than 2 mm.

25. The system of claim 21, wherein the electron emitted from the radioactive source material has an energy of approximately 2 MeV, the thickness is selected such that the electron is prevent from passing through the first shield.

26. The system of claim 21, further comprising:
a fuel source comprising the radioactive source material; and
a fuel container configured to house the fuel source, wherein the first shield is configured to encase the fuel container, and the second shield is configured to encase the first shield.

27. The system of claim 26, wherein:
the fuel source comprises Strontium Titanate; and
the radioactive source material comprises Strontium-90.

28. The system of claim 26, wherein the radioactive source material comprises a high-energy beta emitter.

29. The system of claim 21, wherein the bremsstrahlung radiation generated by the electron is generated in the first shield, and the bremsstrahlung radiation generated in the first shield is attenuated in the first shield or the second shield.

30. The system of claim 21, wherein the bremsstrahlung radiation generated by the electron is generated in a fuel container configured to house a fuel source comprising the radioactive source material, the bremsstrahlung radiation generated in the fuel container is attenuated in the first shield or the second shield.

31. The system of claim 21, further comprising:
a fuel design, comprising:
a radioactive source material comprising a high-energy beta emitter, wherein:
the fuel design is configured to have a thickness that is equal to or less than the mean-free path, and
electrons emitted by the radioactive source material as a result of a beta decay process are able to pass through the fuel design without being stopped so as to prevent bremsstrahlung radiation from being generated within the fuel design.

32. The system of claim 31, wherein:
the radioactive source material comprises Strontium Titanate;
the high-energy beta emitter comprises Strontium-90;
the mean-free path of electrons emitted by the radioactive energy source comprises 2 millimeters (mm);
the thickness of the fuel design comprises 2 mm or less; and
the thickness of the first shield is greater than 2 mm.

33. The system of claim 31, wherein the radioactive source material is formed of spherical structures having the thickness, the spherical structures being dispersed in the first shield, and the second shield being configured to encase the first shield including the spherical structures dispersed therein.

34. The system of claim 31, wherein the fuel design comprises a first plurality of cylinders and the first shield comprises a second plurality of cylinders, wherein the first plurality of cylinders and the second plurality of cylinders are concentric.

35. The system of claim 34, wherein the second shield comprises a cylinder configured to encase the first plurality of cylinders and the second plurality of cylinders.

36. The system of claim 34, wherein the first plurality of cylinders each have the thickness, the thickness being 2 mm.

* * * * *